June 6, 1972  A. A. PARISH  3,667,861
WIND VANE CONTROLLING DIRECTION AND BRAKE MEANS
Filed May 1, 1970  2 Sheets-Sheet 1

Albert A. Parish
INVENTOR.

BY Clarence A. O'Brien
and Harvey B. Jacobson
Attorneys

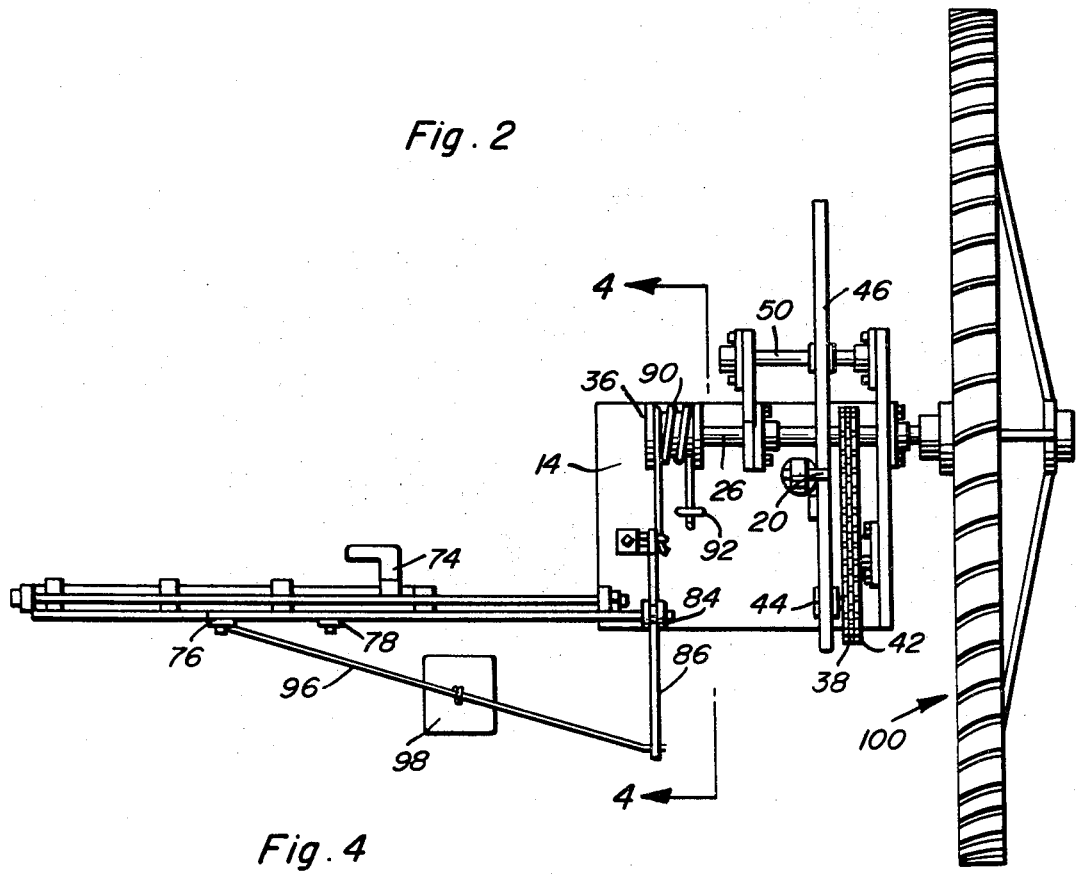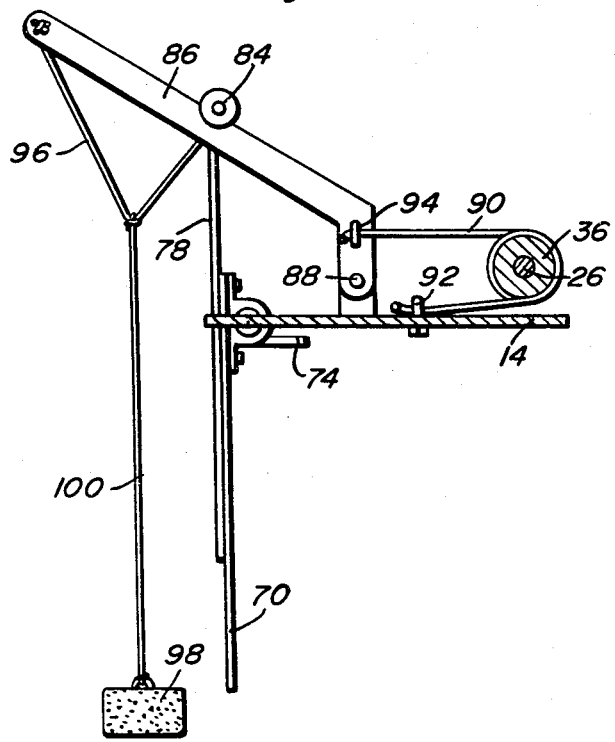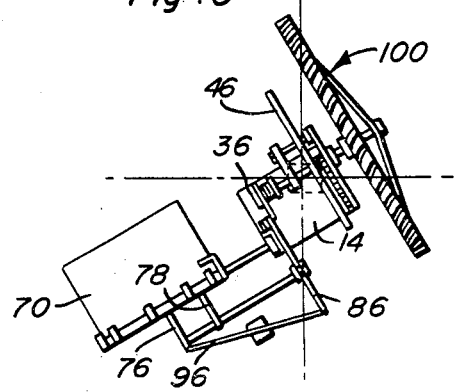

United States Patent Office 3,667,861
Patented June 6, 1972

3,667,861
WIND VANE CONTROLLING DIRECTION
AND BRAKE MEANS
Albert A. Parish, Earth, Tex., assignor to K.M.P.
Lake Pump Mfg. Co., Earth, Tex.
Filed May 1, 1970, Ser. No. 33,590
Int. Cl. F03b 7/00
U.S. Cl. 416—14                2 Claims

ABSTRACT OF THE DISCLOSURE

A windmill including a base and a rotary blade structure journalled from the base for rotation about a horizontal axis. The base includes a rearwardly displaced upstanding tail vane depending and journalled from a shaft paralleling and spaced to one side of the blade structure axis of rotation. The base is supported for rotation about an upstanding axis laterally spaced to the other side of the axis of rotation of the rotary blade structure, and is provided with brake structure operable on the blade structure and actuated by the tail vane upon swinging of the tail vane from a vertical position toward a horizontal position.

---

The windmill head of the instant invention has been designed to provide a wind-driven power source which may be mounted adjacent and utilized to drivingly reciprocate the sucker rod of a well. The windmill head includes a large reaction surface area blade structure for driving a sucker rod in even the lightest breezes and also structure by which the rotary blade structure may be swung to a position with its axis of rotation inclined relative to the direction of the wind so as to thereby reduce the effectiveness of the blade assembly as the velocity of the wind increases. Further, the windmill head is also provided with brake structure for braking the blade structure against rotation. The brake structure is provided with an actuator operable to apply the brake structure to prevent rotation of the blade structure in response to the head being turned out of the wind in response to a high velocity wind acting thereon.

In this manner, a large reaction surface area blade assembly may be provided for driving the sucker rod of a pump in the lightest of breezes and yet the windmill is protected against high velocity winds in that its rotary blade structure is turned out of the wind and braked in response to a high velocity wind acting upon the windmill head.

The main object of this invention is to provide a windmill which will be capable of developing reasonable amounts of power in light breezes but which includes structure for automatically sensing high velocity winds and turning the rotary blade structure of the windmill out of the wind and braking the rotary blade structure in response to high velocity winds.

Still another object of this invention is to provide a windmill structure in accordance with the preceding object and constructed in a manner whereby it may be mounted close to the ground and it may derive sufficient power from lower level ground breezes.

A final object of this invention to be specifically enumerated herein is to provide a windmill which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 2 is a top plan view of the windmill structure illustrated in FIG. 1;

Figure 1:
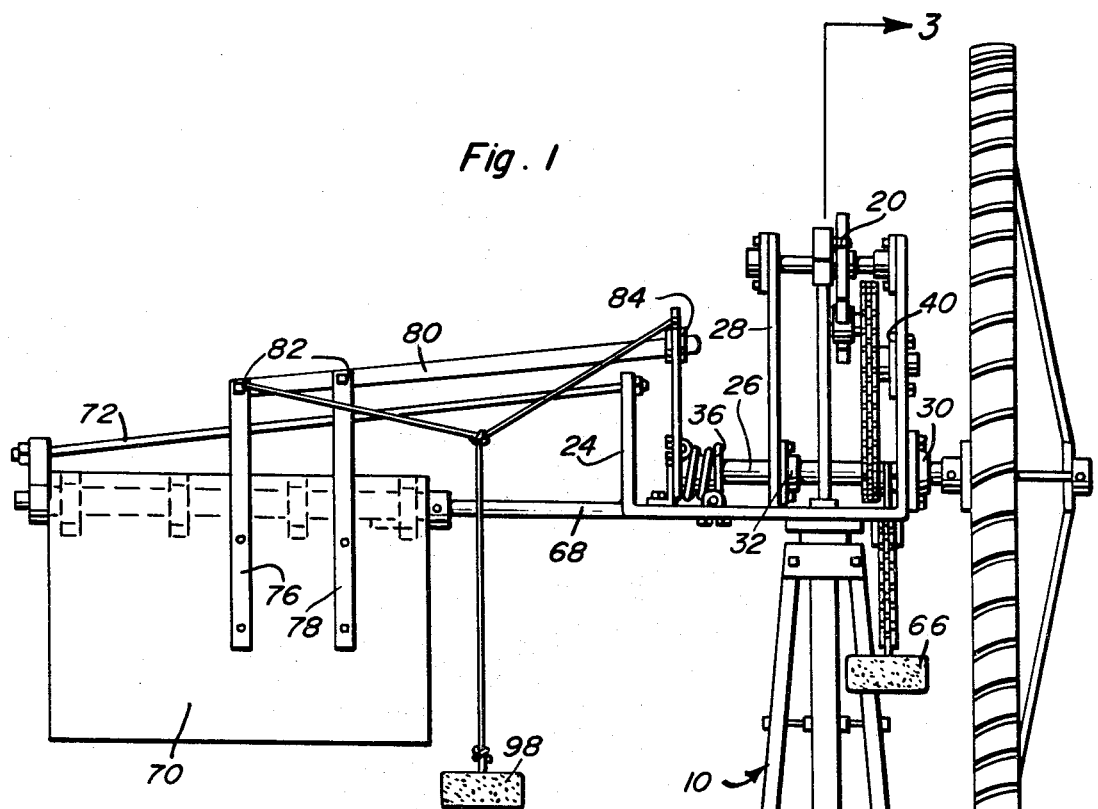
FIG. 1 is a side elevational view of the windmill structure of the instant invention.
Figure 3:
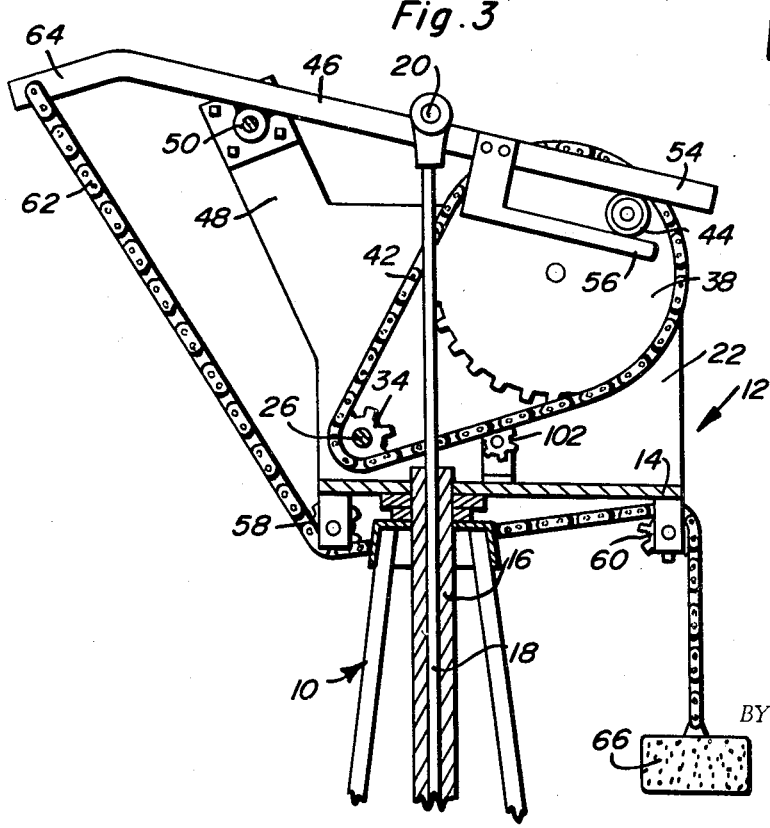
FIG. 3 is an enlarged fragmentary vertical sectional view taken substantially upon the plane indicated by the section line 3—3 of FIG. 1.

FIG. 4 is an enlarged fragmentary vertical sectional view taken substantially upon the plane indicated by the section line 4—4 of FIG. 2; and FIG. 5 is a top plan view of the windmill on somewhat of a reduced scale and illustrating the manner in which the rotary blade portion thereof is turned out of the wind and the brake actuating wind vane portion thereof is swung to apply the rotary blade structure brake.

Referring now more specifically to the drawings, the numeral 10 generally designates a stand upon whose upper end a windmill head referred to in general by the reference numeral 12 is mounted. The windmill head 10 includes a base plate 14 which is rotatably supported from the upper end of the stand 10 for rotation about an axis concentric with the center axis of an upstanding sleeve bearing 16 supported from the stand 10. A sucker rod 18 is reciprocal through the sleeve bearing 16 and carries a forwardly projecting journaled stub shaft 20 at its upper end.

Front and rear support flanges 22 and 24 project upwardly from the base or base plate 14 and a front to rear extending power shaft 26 is journaled through the support flange 22 and an intermediate upstanding support flange 28 disposed rearward of the flange 22 and forward of the flange 24. The flange 28 is also supported from the base plate 14 and the flanges 22 and 26 include bearing assemblies 30 and 32 through which the front and rear ends of the shaft 26 are journaled. A sprocket wheel 34 is mounted on the shaft 26 for rotation therewith as is a brake drum 36. The sprocket wheel 34 is aligned with a cam sprocket wheel 38 journaled from the support flange 22 by means of a bearing structure 40 and an endless flexible chain 42 is trained about the sprocket wheels 34 and 38.

The cam sprocket wheel 38 includes an eccentric journaled roller 44 and a lifting arm or walking beam 46 is oscillatably supported from an extension 48 of the support flange 22 as at 50 and includes one end portion 54 which overlies the roller 44 and underlies the stub shaft 20. A breakaway arm 56 is carried by the end portion 54 of the lifting arm 46 and extends beneath the roller 44 whereby the latter is maintained captive between the end portion 54 and the breakaway arm 56.

A pair of idle sprocket wheels 58 and 60 are journaled in depending relation beneath the base plate 14 and one end of an endless flexible chain 62 is attached to the slightly downturned end 64 of the walking beam 46 remote from the end portion 54 while the other end portion of the chain 62 is trained beneath the sprocket wheel 58 and over the sprocket wheel 60 and has a counter-balance weight 66 secured to its free end.

A horizontal rearwardly projecting support shaft 68 is carried by the rear marginal edge portion of the base plate 14 and has a panel-like wind vane 70 journaled on its rear end portion for movement bewteen a vertical position such as that illustrated in FIGS. 1, 2 and 4 of the drawings and a horizontal position such as that illustrated in FIG. 5 of the drawings. The support shaft 68 has its rear end supported by the rear end of a rearwardly and downwardly inclined brace rod 72 whose forward end is secured through the upper end of the support flange 24. In addition, the support shaft 68 includes a horizontal abutment 74 engageable by and constituting a limit of movement for the wind vane 70 to its horizontal position.

The wind vane 70 includes a pair of upwardly projecting arms 76 and 78 whose lower ends are secured to and extend along the wind vane 70. The rear end portion of a brake operating bar 80 is secured to the upper ends of the arms 76 and 78 as at 82 and the forward end of the brake opearting bar 80 includes a roller 84 which is rollingly engaged with the upper surface of an elongated brake actuating lever 86 pivotally supported from the base plate 14 as at 88.

One end of an elongated flexible brake band member 90 is anchored to the base plate 14 as at 92 and the other end of the brake band member 90 is anchored to the brake actuating lever 86 as at 94. Accordingly, oscillation of the weather vane 70 in a counterclockwise direction as viewed in FIG. 4 of the drawings will cause the roller 84 to pivot the brake actuating lever in a counterclockwise direction and the brake band member 90 to be tightened about the brake drum 36 mounted on the shaft 26. A bridle line 96 extends between the upper ends of the arm 76 and the brake actuating lever 86 and a weight 98 is suspended from the mid-portion of the bridle line 96 by means of a support line 100. Thus, the weight 98 tends to pivot the wind vane 70 in a counterclockwise direction. However, the wind vane 70 itself is weighted so as to be urged toward an upright position such as that illustrated in FIGS. 1, 2 and 4 of the drawings and the inherent weighting of the wind vane 70 is suffiicent to overcome the biasing action of the weight 98.

A bladed wheel referred to in general by the reference numeral 100 is mounted on the forward end of the shaft 26 and turns in a clockwise direction as viewed from the front when the windmill head 12 is faced into the wind by means of its wind vane 70. Rotation of the bladed wheel 100 in the shaft 26 will of course cause the sprocket wheel 34 to be rotated and to drive the sprocket wheel 38 through the endless flexible chain 42 which is tensioned by means of a tension sprocket 102 supported from the base plate 14. Thus, the actuating lever or walking beam 46 is oscillated so as to cause the sucker rod 18 to be vertically reciprocated. The breakaway arm 56 is provided and will breakaway at its point of support from the end portion 54 of the lever arm 46 in the case of "sand down" or freezing of the pump actuated by the sucker rod 18.

From FIG. 2 of the drawings it will be noted that the axis of rotation of the shaft 26 is laterally spaced to the right of the axis of rotation of the windmill head 12 relative to the stand 10 as the windmill head 12 is viewed from the front. Further, the axis of rotation of the wind vane 70 is laterally spaced to the left of the axis of rotation of the windmill head 12. Inasmuch as the shaft 26 is spaced to the right of the pivot axis of the head 12, when a strong wind is encountered as from the right side of FIG. 2 the offset relation of the bladed wheel 100 relative to the axis of rotation of the windmill head 12 will cause the head 12 to pivot in a counterclockwise direction as viewed from above toward a position such as that illustrated in FIG. 5 of the drawings whereby the bladed wheel 100 will be turned slightly out of the wind so as to reduce the effectiveness of the wind on the bladed wheel 100. As the head 12 is rotated to the position thereof illustrated in FIG. 5 of the drawings, the wind vane 70 is inclined relative to the direction of the wind thus the wind has a tendency to swing the wind vane 70 from the vertical position thereof illustrated in FIGS. 1, 2 and 4 of the drawings toward the horizontal position thereof illustrated in FIG. 5 of the drawings in which position the brake actuating bar 80 and roller 84 urged downwardly upon the brake actuating lever 86 tighten the brake band member 90 about the drum 36. In this manner, when a wind sufficiently strong to rotate the windmill head 12 to the position thereof illustrated in FIG. 5 is encountered, the bladed wheel 100 is turned away from the wind and the brake band member 90 is tightened about the drum 36 whereby the latter is braked to a stop and the bladed wheel 100 ceases to rotate. In this manner, damage to the bladed wheel or working componentns of the windmill head 12 due to excessively strong winds is prevented. Of course, as soon as the velocity of the wind is reduced, the wind vane 70 tends to swing back toward the vertical position so as to release the braking action of the band 90 on the drum 36 and as the vane 70 is swung back toward the vertical position, its effectiveness to maintain the windmill head 12 headed into the wind is increased and the windmill head 12 is swung back toward a position with the bladed wheel 100 facing directly into the wind.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A windmill head including a base rotatable about a first upstanding axis, and including bladed wheel structure journaled for rotation about a second horizontal axis spaced horizontally to one side of said upstanding axis, said base further including wind vane means for maintaining said base in a position with said wheel structure facing into the wind, said vane means comprising an upstanding panel member supported from said base in a rearwardly disposed position for oscillation about a third horizontal axis generally paralleling said second axis, spaced horizontally to the other side of said first axis and extending along the upper marginal portion of said panel member, the offset of said wheel axis relative to the base axis serving to cause said base to rotate about its axis and swing said wheel structure away from a position facing into the wind as the velocity of the wind increases above a predetermined minimum, brake means for said bladed wheel structure actuatable by said wind vane means for progressively actuating said brake means as said vane means is swung from its vertical position toward a horizontal position, whereby increased wind force on said wheel structure to turn said head in a direction swinging said wheel structure away from the wind flow will swing said wind vane to a position transverse to the wind flow and said wind vane will swing about said third axis toward a horizontal position by the wind force, and means connecting said wind vane and said brake means for actuating the latter in response to the wind vane being swung toward its horizontal position, a walking beam oscillatably supported therefrom, a driven wheel driven by said bladed wheel structure, and a slider crank mechanism drivingly connecting said driven wheel to one end of said walking beam.

2. The combination of claim 1 including counterbalance weight means operatively connected to the other end of said walking beam.

(References on following page)

References Cited

UNITED STATES PATENTS

| | | | |
|---|---|---|---|
| 594,442 | 11/1897 | Swanson | 416—14 |
| 670,805 | 3/1901 | Nicholl | 416—14 |
| 759,265 | 5/1904 | Goddard | 74—45 |
| 877,434 | 1/1908 | Kappelmann | 416—14 |
| 1,005,602 | 10/1911 | Collin | 416—14 |
| 1,986,012 | 1/1935 | Patterson | 74—45 |
| 2,471,876 | 5/1949 | Khun | 74—45 |

FOREIGN PATENTS

| | | | |
|---|---|---|---|
| 229,730 | 2/1910 | Germany | 416—41 |

EVERETTE A. POWELL, Jr., Primary Examiner

C. F. SCHIMIKOWSKI, Assistant Examiner

U.S. Cl. X.R.

416—32, 41